United States Patent [19]

Moran et al.

[11] Patent Number: 5,036,311
[45] Date of Patent: Jul. 30, 1991

[54] UV EXPOSURE MONITORING SYSTEM

[76] Inventors: Dan Moran, 19 Aluf David Street, Ramat Chen, Ramat Gan; Yonatan Gerlitz, 23 Malchei Yisrael Street, Herzliya, both of Israel

[21] Appl. No.: 313,999

[22] Filed: Feb. 22, 1989

[30] Foreign Application Priority Data

Feb. 29, 1988 [IL] Israel ............................................. 85575

[51] Int. Cl.$^5$ .................................................. G01J 5/32
[52] U.S. Cl. ...................................... 340/600; 250/372
[58] Field of Search ............... 340/600, 584, 573, 540, 340/309.15, 309.2; 128/207.21; 250/372

[56] References Cited

U.S. PATENT DOCUMENTS

| | | | |
|---|---|---|---|
| 2,114,163 | 4/1938 | Bird | 250/372 |
| 3,710,115 | 1/1973 | Jubb | 250/372 |
| 3,903,423 | 9/1975 | Zweig | 250/474.1 |
| 4,010,372 | 3/1977 | Adler et al. | 250/372 |
| 4,348,664 | 9/1982 | Boschetti et al. | 340/600 |
| 4,428,050 | 1/1984 | Pellegrino et al. | 364/414 |
| 4,535,244 | 8/1985 | Burnham | 250/372 |
| 4,704,535 | 11/1987 | Leber et al. | 250/372 |
| 4,763,011 | 8/1988 | Socith | 250/372 |
| 4,818,491 | 8/1989 | Faris | 250/372 |
| 4,882,598 | 11/1989 | Wolf | 250/372 |

FOREIGN PATENT DOCUMENTS 3126127 1/1983 Fed. Rep. of Germany .

Primary Examiner—Joseph A. Orsino
Assistant Examiner—Jill Jackson
Attorney, Agent, or Firm—Abelman Frayne Rezac & Schwab

[57] ABSTRACT

A UV exposure mointoring system for measuring UV radiation impinging on an object, the system comprising apparatus for measuring incident solar UV radiation in a weighted manner corresponding to the erythemal action spectrum of human skin, whereby the accuracy of the measurements is substantially unaffected by the amgle of incidence of incoming radiation over a wide range of angles.

15 Claims, 4 Drawing Sheets

UV EXPOSURE MONITORING SYSTEM

FIELD OF THE INVENTION

The present invention relates to apparatus for measuring UV radiation generally and more particularly to UV exposure indication devices.

BACKGROUND OF THE INVENTION

Human skin processes occurring as a result of exposure to UV radiation, emanating either from the sun or from an artificial light source, have been investigated thoroughly over the past year. Erthema, the well known sunburn response of human skin, occurs as a result of exposure to UV radiation of wave lengths in the region of 250–400 nm (UV-C, UV-B, and UV-A), and disappears with time. Factors found to influence the erythemal process include the individual skin type, the initial skin pigmentation, and the sun protection factor (SPF) of the tanning lotion being used. Recent research reviewed by McKinlay and Diffey ("A reference action spectrum of ultra-violet induced ethyema in human skin", presented at the UV Hazards Conference, Amsterdam, 1987, pp. 83-87) has focused on determining the skin's erythema action spectrum, the relative sensitivity of the skin to erythema as a function of the wave length of the radiation to which the skin has been exposed.

The MED (minimal erythema dose) has been defined by medical research as the minimal dose of radiation capable of producing a detectable erythema reaction. However, repeated exposure to radiation below the MED can have an accumulative effect in producing sunburn. The accumulative effectiveness of exposure below the MED has been found to linger for 12-24 hours.

Various devices have been proposed for monitoring the erythemal and/or tanning effect of UV radiation (U.S. Pat. Nos. 4,485,306; 4,428,050; 4,010,372; 3,710,115; 4,348,664; and 2,114,163, West German 3,126,127). Some of these devices are capable of simulating the skin's relative responsiveness to UV radiation as a function of the wavelength of that radiation, as indicated by the erythema action spectrum. None of the device described in the above patents has been successful in accurately simulating the sensitivity of the skin to UV radiation as a function of wavelength in accordance with the erythema action spectrum without being unacceptable dependent on the angle of incidence of the UV radiation.

Simply stated, the prior art UV exposure sensors have not been able to overcome the inherent limitation in optical filters operative with a desired transmissivity/wavelength relationship in the region of interest, namely that such filters are extremely sensitive to the angle of incidence of the incoming UV radiation.

Accordingly, the prior art devices are not suitable for ordinary use by the public in outdoor environments wherein accurate positioning of the sensor is not readily achieved.

SUMMARY OF THE INVENTION

The present invention seeks to provide an improved system for alerting humans to impending overexposure to UV radiation.

There is thus provided in accordance with a preferred embodiment of the present invention a UV exposure monitoring system for measuring UV radiation impinging on an object, the system comprising apparatus for measuring incident solar UV radiation in a weighted manner corresponding to the erythemal action spectrum of human skin, whereby the accuracy of the measurements is substantially unaffected by the angle of incidence of incoming radiation over a wide range of angles.

In accordance with a preferred embodiment of the present invention, the apparatus for measuring comprises a filter and a detector whose wavelength responses are selected such that the overall wavelength dependent response corresponds to the erythemal action spectrum of human skin.

Further in accordance with a preferred embodiment of the present invention, the apparatus for measuring comprises a filter formed as a coating onto a curved substrate.

There is also provided in accordance with a preferred embodiment of the present invention for altering humans to impending overexposure to UV radiation comprising a UV radiation detection system as described above and wherein the curved filter possesses spectral transmittance characteristics which, in combination with spectral response characteristics of the detector, simulate the erythemal action spectrum of human skin, overexposure detection apparatus associated with the detection system, and overexposure warning apparatus for alerting a user to impending overexposure to UV radiation.

Further in accordance with a preferred embodiment of the present invention, the overexposure detection apparatus includes apparatus for receiving the measurements from the UV detector, apparatus for calculating a maximal time period for which user can expose himself to UV radiation emanating from the source within a predetermined time period without developing an erythemal reaction, apparatus for measuring and storing information regarding duration of user's exposure to UV-radiation within the predetermined time period preceding contemplated further exposure, and apparatus for calculating and providing an output indication of a residual time period for which the user can further exposure himself to UV radiation emanating from the source without developing an erythemal reaction. Preferably a visual display is provided for displaying the output indication.

Still further in accordance with a preferred embodiment of the present invention, the overexposure detection apparatus also includes apparatus for receiving at least one control input manually inputted by said user, said at least one control input representing one or more factors affecting the user's erythemal response to UV radiation, and thus affecting the maximal time duration for which the user can exposure himself to UV radiation within a predetermined time period without developing an erythemal reaction.

Additionally in accordance with a preferred embodiment of the present invention, the factors affecting the user's erythemal response to UV-radiation comprise at least one of the following factors: skin type/skin color, skin protection factor of a skin protection cream employed by the user.

Further in accordance with a preferred embodiment of the present invention, the overexposure warning apparatus comprises one or more of the following devices: a device for outputting a warning signal to the user when the user can no longer expose himself to UV-radiation without risking an erythemal reaction, and a device for displaying the residual time for which the user can further expose himself to the UV-radiation without developing an erythemal reaction.

In accordance with a preferred embodiment of the present invention, the filter is formed onto a spherical surface and the detector is disposed at the center of the spherical surface. Preferably the spherical surface is a dome of uniform thickness, such that its inner and outer surfaces are parallel and thus the dome substantially does not have optical power.

In accordance with a further preferred embodiment of the present invention, the filter is integrally formed with the detector.

In accordance with a preferred embodiment of the present invention there is provided a highly accurate wavelength dependent radiation detector which is insensitive to angles of incidence over a wide range and which comprises a detector having a radiation transmissive cover, and a filter being defined by a coating formed on said cover.

In accordance with a preferred embodiment of the present invention, the monitoring system also comprises alignment indication apparatus to allow user to generally orient the UV-radiation detection system with respect to the source such that the angle of incidence of the incoming UV-radiation will fall within the wide range of angles.

Further in accordance with a preferred embodiment of the present invention, the alignment indication apparatus comprises an analog or digital indicator.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
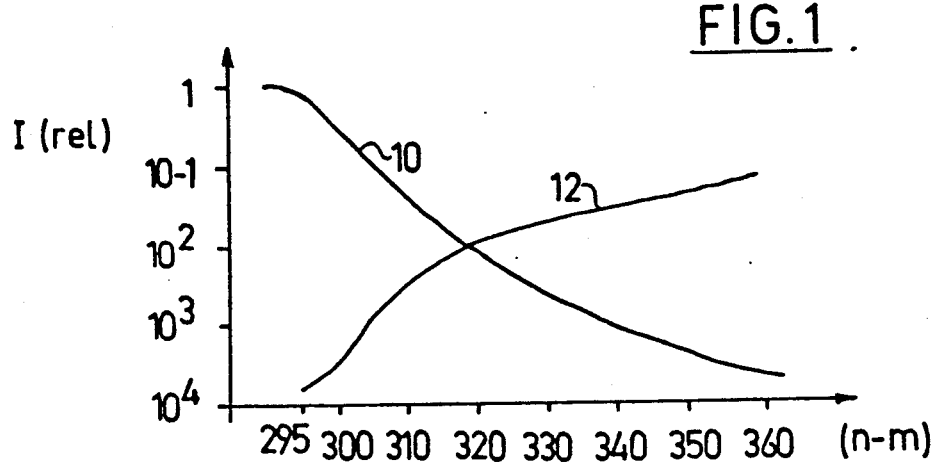
FIG. 1 is a graph of a typical erythemal action spectrum superimposed upon a curve describing the typical intensity of UV radiation emanating from the sun at ground level as a function of the radiation wavelength.

Reference is now made to FIG. 1 which is a graph depicting a typical erythemal action spectrum 10 superimposed upon a curve 12 describing the typical intensity of UV radiation emanating from the sun at ground level as a function of the radiation wavelength. It may be seen by inspection of spectrum 10 that relative sensitivity of the skin to erythema due to exposure to UV-radiation declines steeply as a function of the wavelength of the UV-radiation in the range of wavelengths shown. Inspection of curve 12 shows that the relative intensity of the sun's radiation reaching the earth is greater for long wave radiation than for short wave radiation within the range of wavelengths shown.

It may be concluded from a consideration of FIG. 1 that the radiation band that must be monitored in order to provide protection against erythema is the and in the general range of 295–370 nm. It may be appreciated that due to the high intensity of solar radiation in the higher wavelength regions, it is extremely important that the characteristics of the monitoring system match the erythema action spectrum as precisely as possible at those wavelengths.

Figure 2:
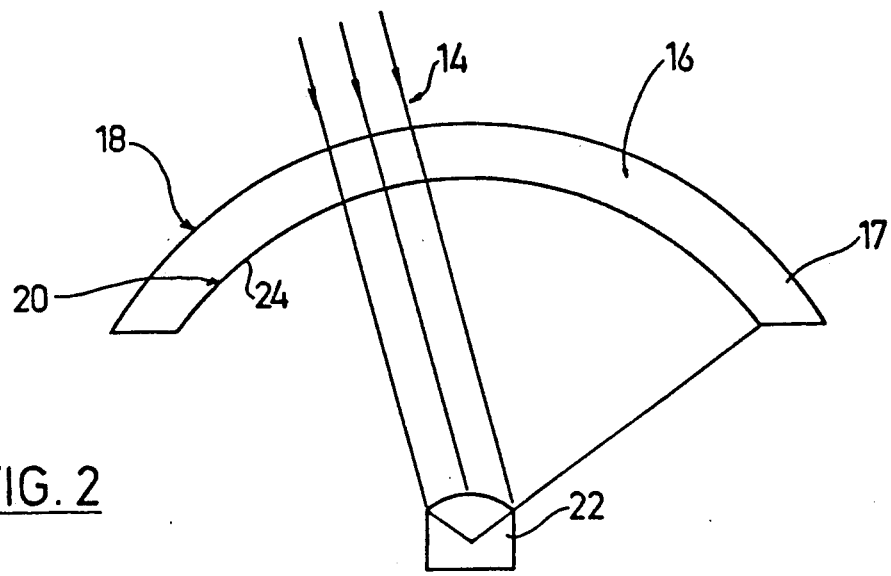
FIG. 2 is a pictorial illustration of a detector-filter combination constructed and operative in accordance with a preferred embodiment of the present invention.

Reference is now made to FIG. 2, which is an enlarged illustration of a detector-filter combination constructed and operative in accordance with a preferred embodiment of the present invention and which is operative to provide monitoring of incident UV radiation with a wavelength dependence corresponding to that of the erythema action spectrum of human skin, generally independently of the angle of incidence of the radiation within an angular window of about +/−45 degrees of elevation.

It is seen that light rays 14 pass through a filter 16 which is preferably of spherical configuration. Filter 16 is defined by a UV transparent spherical shaped substrate 17 typically formed of used silica and having generally parallel outer and inner surfaces 18 and 20.

One of both surfaces of the substrate 17 are provided with thin film coatings in a conventional manner in order to provide relative optical transmission preferably in accordance with the following table:

| Wave Length (nm) | Relative Transmission |
| --- | --- |
| 295 | 1.00 |
| 300 | 0.7–0.76 |
| 305 | 0.35–0.4 |
| 310 | 0.12–0.15 |
| 315 | 0.06–0.075 |
| 320 | 0.025–0.03 |
| 325 | 0.014–0.020 |
| 330 | 0.008–0.010 |
| 335 | 0.005–0.008 |
| 335–500 | <0.0055 |

Substrates and coating to the above specifications is commercially available from Omega Optical Inc. of 3 Grove Street Brattleboro, Vt., U.S.A.

The light rays passing through filter 16 impinge upon a detector 22 which is located at the center of the spherical substrate. The spherical shape of filter 16 enables all of the rays impinging on the detector to pass through the filter 16 in a direction normal to the coated surface. Accordingly, the wavelength transmittance characteristics of the filter 16 are not affected by the angle of incidence of the solar UV radiation within the +/−45 degrees window.

Detector 22 may be of any suitable type, such as a Hamamatsu R1826 phototube.

Figure 7:
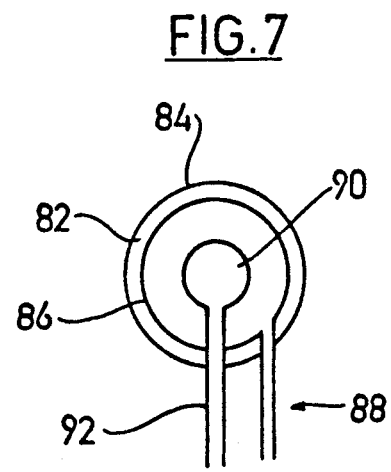
FIG. 7 is a pictorial illustration of a detector-filter combination constructed and operative in accordance with a further preferred embodiment of the present invention.

Reference is now made to FIG. 7, which is a sectional illustration of a detector-filter combination comprising a vacuum phototube and integral filter constructed and operative in accordance with a further preferred embodiment of the present invention. This configuration eliminates the cosine reduction of the incident radiation by employing a spherically shaped cathode as opposed to a flat detector.

A spherical structure 82 comprising a cathode is formed of UV transmission material such as fused silica. Spherical structure 82 is coated on one of its surfaces, typically the outermost surface 84, with a short wavelength pass coating, and on its other surface, typically the innermost surface 86, with a layer of UV-sensitive material such as CsTe, and is connected via cathode connecting means 88. An anode 90, being of any suitable configuration for collecting electrons emitted from cathode 82, is connected by anode connecting means 92. The detector-filter combination illustrated herein has the added advantage of being simple and economical to manufacture relative to existing detector-filter combinations wherein the detector and the filter are not integrally formed.

Figure 3:
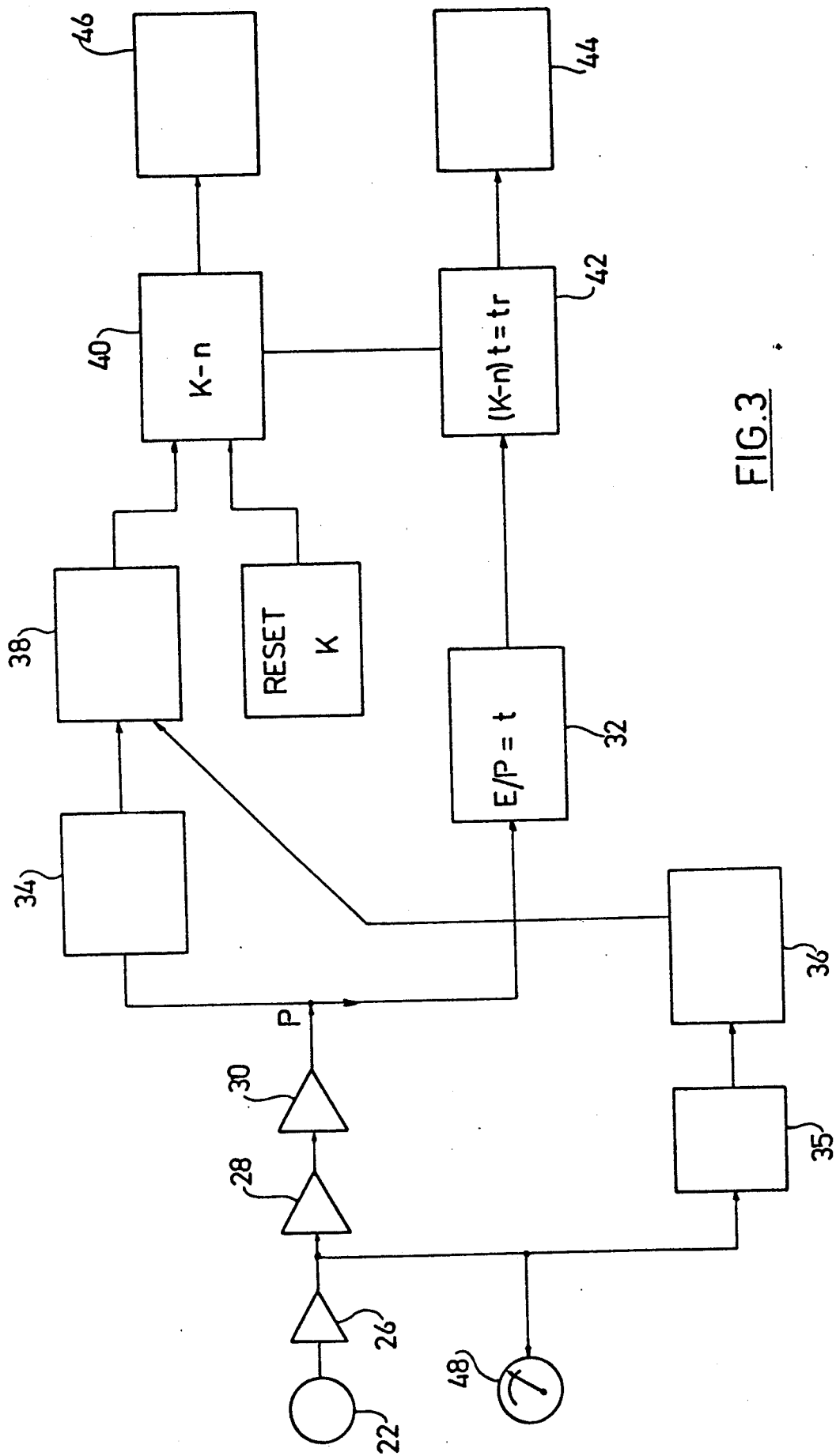
FIG. 3 is a block diagram of logic implemented in a system for alerting humans to impending overexposure to UV-radiation constructed and operative in accordance with a preferred embodiment of the present invention.

Reference is now made to FIG. 3 which is a block diagram of logic implemented in a system for alerting humans to impending overexposure to UV-radiation constructed and operative in accordance with a preferred embodiment of the present invention. A detector 22 located at the center of filter 16 detects incoming UV-radiation and outputs to preamplifier 26. The output is then scaled by skin color factor amplifier 28 and by sun protection factor amplifier 30. An energy quantum E is arbitrarily defined, and a constant K describing the number of energy quanta E in a single Med is then determined.

The scaled output P of amplifiers 28 and 30 is used by calculating element 32 to calculate $t = E/P$, the updated amount of time during which one energy quantum E is absorbed by skin exposed to UV-radiation of an intensity equal to that detected by the phototube at that time. Simultaneously, scaled output P of amplifiers 28 and 30 is quantified continuously by a quantifier 34.

An integrator 38 integrates the number of scaled energy quanta detected by detector 22 and calcualtes N, the number of scaled energy quanta absorbed by skin exposed to UV-radiation of scaled intensity P over a period of time equal to the total duration of the successive exposure sessions recorded.

A comparator 40 uses stored preset value K, and number of absorbed quanta N, inputted from integrator 38, to calculate $K - N$, the number of scaled energy quanta which may still be safely absorbed by a person who has been exposed to N quanta of UV-radiation over the past 12 hour period.

A residual time calculator 42 inputs the value of $K - N$ from calculator 40 and the value t from comparator 32 and calculates $t = t(k - N)$, the residual time over which a person previously exposed to N quanta of radiation may safely continue to expose himself, and outputs $t_r$ to a digital time display 44.

When $K - N$ reaches zero, an audio alert element 46 provides an audio alert signal indicating that continued exposure to UV-radiation places the exposed person in danger of developing an erythemal reaction.

Preamplifier 26 also output to analog indicator 48, which enables user to align the apparatus with respect to the sun so that the intensity of UV-radiation being detected by the system is maximal. This desirable in order to ensure that the angle of incidence of the sun's radiation on the system falls within a broad range of approximately plus/minus 45° over which the device is accurate.

A counter 36 presets N in integrator 38 to zero once 12 hours have passed between successive detections of UV radiation. Should UV radiation be detected, a comparator 35 is operative to reset counter 36 to zero.

Figure 4:
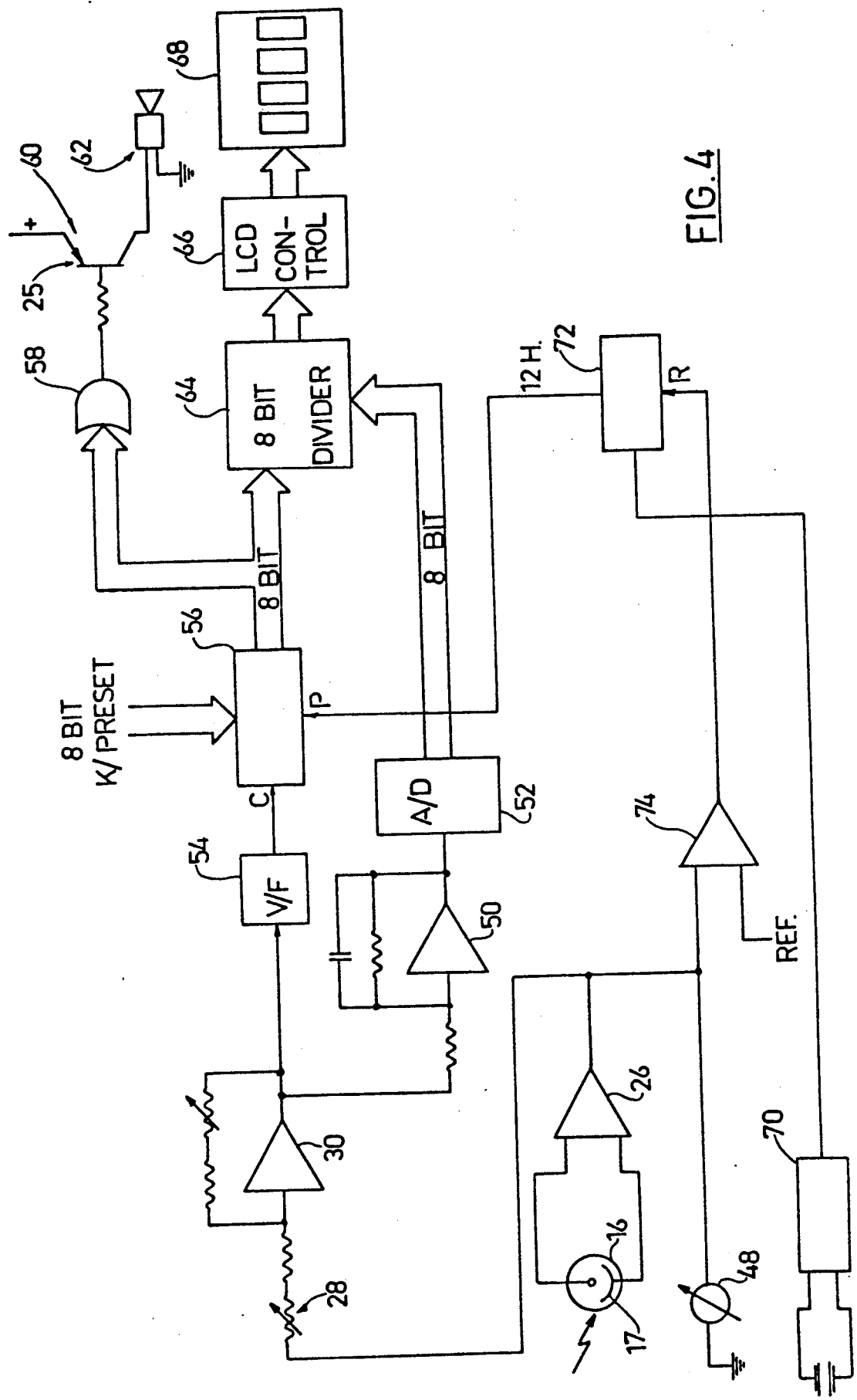
FIG. 4 is a schematic block diagram illustrating electronic circuitry and electro-optical components constructed and operative in accordance with a preferred embodiment of the present invention.

Reference is now made to FIG. 4, which is a schematic block diagram illustrating electronic circuitry and electro-optical components constructed and operative in accordance with a preferred embodiment of the present invention. Incoming UV-radiation outputs a phototube 17 through filter 16 and preamplifier 26 to skin color factor amplifier 28 and subsequently to sun protection factor amplifier 30.

The scaled output P of amplifiers 28 and 30 is divided by arbitrarily determined energy quantum size E at scaled amplifier 50, and the resulting value 1/t is converted to digital pulses by A/D component 52. A V/F component 54 quantizes scaled output P and a presettable down counter 56 utilizes predetermined value K to calculate the value of $K - N$. When the value of $K - N$ reaches zero, OR-gate 58 activates audio alarm 62 via power transistor 60.

The output of down counter 56 is divided by the output of A/D components 52 by 8 bit divider 64 and the value obtained thereby inputs LCD display control 66. LCD display control 66 activates a four digital display device 68, which displays the amount of time remaining for safe exposure to UV-radiation to the user.

Counters 70 and 72 record the amount of time that has elapsed from termination of the most recent UV-exposure session and reset the value of N in counter 56 to zero when the elapsed amount of time reaches 12 hours. Counter 72 is reset to zero by comparator 74 if UV-radiation is detected within the 12 hour period.

Preamplifier 26 is also outputs to analog indicator 48, which enables user to align the apparatus with respect to the sun until the intensity of UV-radiation being detected by the system is maximal.

Figure 5:
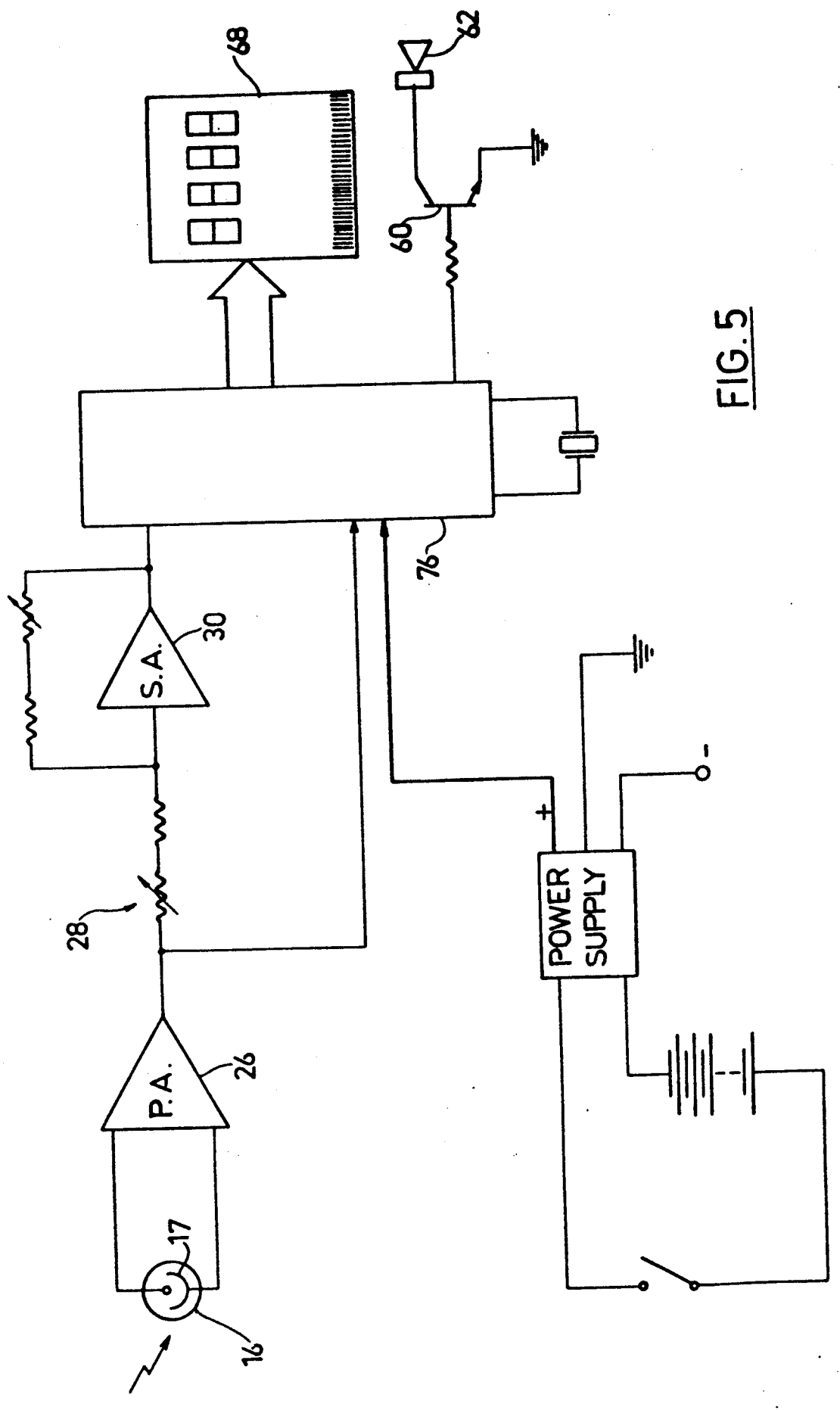
FIG. 5 is a schematic block diagram illustrating electronic circuitry, electro-optical components and a microprocessor constructed and operative in accordance with a alternative preferred embodiment of the present invention.

With reference to FIG. 5, it is seen that alternatively, the system may be implemented by employing a microprocessor 76, such as an Intel MCS 96, this embodiment being in other respects similar or identical to that illustrated in FIG. 4.

Figure 6:
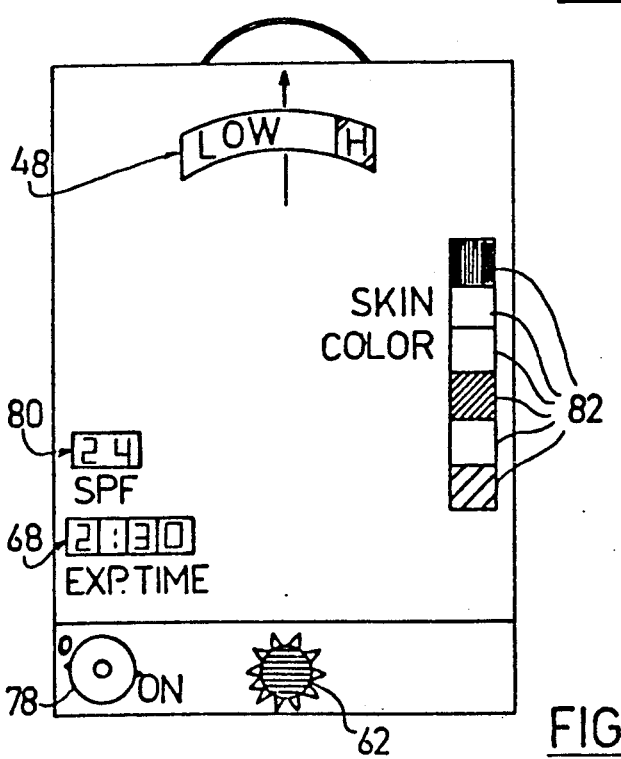
FIG. 6 is an outline drawing of a system for alerting humans to impending overexposure to UV-radiation constructed and operative in accordance with a preferred embodiment of the present invention.

Reference is now made to FIG. 6 which illustrates an improved system for alerting humans to impending overexposure to UV-radiation in accordance with a preferred embodiment of the present invention. A user of the systems puts dial 78 on the ON position, manually inputs the sun protection factor of the sun protection cream he employs (this factor is generally indicated on the packaging of commercially available sun protection creams) at SPF input station 80, manually inputs his skin color by comparing his skin color to a plurality of skin-colored indicators associated with a potentiometer side 82 and positioning the potentiometer slide at a location corresponding to the location of an indicator most resembling his own skin in color.

The user then aligns the system roughly with the sun by selecting that position of the system relative to the sun which results in the maximum reading on analog indicator 48. Digital display 68 will then display the residual amount of time available to the user for safe exposure to UV radiation under the inputted conditions. Audio alert means 62 alerts user when the residual amount of time reaches zero, indicating that user should not risk future exposure to UV-radiation.

It will be appreciated by persons skilled in the art that the present invention is not limited by what has been particularly shown and described hereinabove. Rather the scope of the present invention is defined only by the claims which follow:

What is claimed:

1. A UV exposure monitoring system for measuring UV radiation impinging on an object, said UV exposure system comprising:

a housing; and apparatus enclosed in said housing for measuring incident solar UV radiation in a weighted manner corresponding to the erythemal action spectrum of human skin, whereby the accuracy of the measurements is substantially unaffected by the angle of incidence of incoming radiation over a wide range of angles, and wherein said apparatus for measuring comprises:

a filter formed as coating onto a spherical surface of a curved substrate; and a detector whose wavelength responses are selected such that the overall wavelength dependent response corresponds to the erythemal action spectrum of human skin and wherein said detector is disposed at the center of said spherical surface.

2. A UV exposure monitoring system for measuring UV radiation impinging on an object according to claim 1 and wherein said spherical surface is a dome of uniform thickness, said dome having parallel inner and outer surfaces.

3. A UV exposure monitoring system for measuring UV radiation impinging on an object, said UV exposure system comprising:

a housing; and apparatus enclosed in said housing for measuring incident solar UV radiation in a weighted manner corresponding to the erythemal action spectrum of human skin, whereby the accuracy of the measurements is substantially unaffected by the angle of incidence of incoming radiation over a wide range of angles, and wherein said apparatus for measuring comprises:

a filter; and a detector whose wavelength responses are selected such that the overall wavelength dependent response corresponds to the erythemal action spectrum of human skin and wherein said filter is integrally formed with said detector.

4. A system for alerting humans to impending overexposure to UV radiation comprising:

a UV exposure monitoring system comprising apparatus for measuring incident solar UV radiation in a weighted manner corresponding to the erythemal action spectrum of human skin, whereby the accuracy of the measurements is substantially unaffected by the angle of incidence of incoming radiation over a wide range of angles, said apparatus for measuring comprising:

a filter formed as a coating onto a curved substrate; and a detector whose wavelength responses are selected such that the overall wavelength dependent response corresponds to the erythemal action spectrum of human skin, and wherein said filter possesses spectral transmittance characteristics which, in combination with spectral response characteristics of said detector, simulate the erythemal action spectrum of human skin;

overexposure detection means associated with said UV exposure monitoring system; and overexposure warning means for alerting a user to impending overexposure to UV radiation.

5. A system for alerting humans to impending overexposure to UV radiation according to claim 4 and wherein said filter is formed onto a spherical surface and said detector is disposed at the center of said spherical surface.

6. A system for alerting humans to impending overexposure to UV radiation according to claim 5 and wherein said spherical surface comprises a dome of uniform thickness, said dome having parallel inner and outer surfaces.

7. A system for alerting humans to impending overexposure to UV radiation according to claim 4 and wherein said filter is integrally formed with said detector.

8. A system for alerting humans to impending overexposure to UV radiation comprising:

a UV exposure monitoring system comprising apparatus for measuring incident solar UV radiation in a weighted manner corresponding to the erythemal action spectrum of human skin, whereby the accuracy of the measurements is substantially unaffected by the angle of incidence of incoming radiation over a wide range of angles, said apparatus for measuring comprising:

a filter formed as coating onto a curved substrate; and a detector whose wavelength responses are selected such that the overall wavelength dependent response corresponds to the erythemal action spectrum of human skin, and wherein said filter possesses spectral transmittance characteristics which, in combination with spectral response characteristics of said detector, simulate the erythemal action spectrum of human skin;

overexposure detection means associated with said UV exposure monitoring system; and overexposure warning means for altering a user to impending overexposure to UV radiation and wherein said overexposure detection means comprises:

means for receiving said measurements from said detector;

means for calculating a maximal time period for which user can expose himself to UV radiation emanating from the sun within a predetermined time period without developing an erythemal reaction;

means for measuring and storing information regarding duration of user's exposure to UV-radiation within said predetermined time period preceding contemplated further exposure; and means for calculating and providing an output indication of a residual time period for which the user can further expose himself to UV radiation emanating from the sun without developing an erythemal reaction.

9. A system for alerting humans to impending overexposure to UV radiation according to claim 8 and also comprising a visual display for displaying said output indication.

10. A system for alerting humans to impending overexposure to UV radiation comprising:
   a UV exposure monitoring system comprising apparatus for measuring incident solar UV radiation in a weighted manner corresponding to the erythemal action spectrum of human skin, whereby the accuracy of the measurements is substantially unaffected by the angle of incidence of incoming radiation over a wide range of angles, said apparatus for measuring comprising:
   a filter formed as a coating onto a curved substrate; and
   a detector whose wavelength responses are selected such that the overall wavelength dependent response corresponds to the erythemal action spectrum of human skin,
   and wherein said filter possesses spectral transmittance characteristics which, in combination with spectral response characteristics of said detector, simulate the erythemal action spectrum of human skin;
   overexposure detection means associated with said UV exposure monitoring system; and
   overexposure warning means for alerting a user to impending overexposure to UV radiation
   and wherein said overexposure detection means also comprises:
   means for receiving at least one control input manually input by the user, said at least one control input representing at least one factor affecting the user's erythemal response to UV radiation, and thus affecting the maximal time duration for which the user can expose himself to UV radiation within a predetermined time period without developing an erythemal reaction.

11. A system for alerting humans to impending overexposure to UV radiation according to claim 10 and wherein said at least one factor affecting the user's erythemal response to UV-radiation comprise at least one of the following factors: skin type/skin color, skin protection factor of a skin protection cream employed by the user.

12. A system for alerting humans to impending overexposure to UV radiation comprising:
   a UV exposure monitoring system comprising apparatus for measuring incident solar UV radiation in a weighted manner corresponding to the erythemal action spectrum of human skin, whereby the accuracy of the measurements is substantially unaffected by the angle of incidence of incoming radiation over a wide range of angles, said apparatus for measuring comprising:
   a filter formed as a coating onto a curved substrate; and
   a detector whose wavelength responses are selected such that the overall wavelength dependent response corresponds to the erythemal action spectrum of human skin,
   and wherein said filter possesses spectral transmittance characteristics which, in combination with spectral response characteristics of said detector, simulate the erythemal action spectrum of human skin;
   overexposure detection means associated with said UV exposure monitoring system; and
   overexposure warning means for alerting a user to impending overexposure to UV radiation
   and wherein said overexposure warning means comprises at least one of the following means:
   means for outputting a warning signal to the user when the user can no longer expose himself to UV-radiation without risking an erythemal reaction; and
   means for displaying the residual time for which the user can further expose himself to the UV-radiation without developing an erythemal reaction.

13. A UV exposure monitoring system for measuring UV radiation impinging on an object, said UV exposure monitoring system comprising:
   apparatus for measuring incident solar UV radiation in a weighted manner corresponding to the erythemal action spectrum of human skin, whereby the accuracy of the measurements is substantially unaffected by the angle of incidence of incoming radiation over a wide range of angles; and
   alignment indication apparatus to allow user to orient generally with respect to the sun such that the angle of incidence of the incoming UV-radiation will fall within said wide range of angles.

14. A UV-exposure monitoring system according to claim 13 and wherein said alignment indication apparatus comprises an analog indicator.

15. A UV-exposure monitoring system according to claim 13 and wherein said alignment indication apparatus comprises a digital indicator.

* * * * *